US012323655B2

(12) United States Patent
Karpakova et al.

(10) Patent No.: US 12,323,655 B2
(45) Date of Patent: Jun. 3, 2025

(54) PROVIDING AND DISPLAYING VIDEO DATA

(71) Applicant: Volkswagen Aktiengesellschaft, Wolfsburg (DE)

(72) Inventors: Elizaveta Karpakova, Berlin (DE); Daniel Georg, Berlin (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 25 days.

(21) Appl. No.: 18/015,698

(22) PCT Filed: Jul. 9, 2021

(86) PCT No.: PCT/EP2021/069241
§ 371 (c)(1),
(2) Date: Jan. 11, 2023

(87) PCT Pub. No.: WO2022/013114
PCT Pub. Date: Jan. 20, 2022

(65) Prior Publication Data
US 2024/0244291 A1    Jul. 18, 2024

(30) Foreign Application Priority Data
Jul. 12, 2020   (DE) .................. 10 2020 208 695.8

(51) Int. Cl.
*H04N 21/4402*   (2011.01)
*B60K 35/28*   (2024.01)
(Continued)

(52) U.S. Cl.
CPC ..... *H04N 21/440218* (2013.01); *B60K 35/28* (2024.01); *H04N 21/41422* (2013.01);
(Continued)

(58) Field of Classification Search
CPC ..... H04N 21/440218; H04N 21/41422; H04N 21/4223; H04N 21/4782; H04N 21/85406
(Continued)

(56) References Cited

U.S. PATENT DOCUMENTS

2010/0070106 A1 * 3/2010 Okamoto .............. G06F 15/163 701/1
2013/0047074 A1 * 2/2013 Vestergaard ..... H04N 21/44004 715/234
(Continued)

FOREIGN PATENT DOCUMENTS

DE    102013200431 A1    7/2014
DE    102017207743 A1    11/2017
(Continued)

OTHER PUBLICATIONS

PCT/EP2021/069241 International Search Report (Oct. 26, 2021).
(Continued)

*Primary Examiner* — Cynthia M Fogg
(74) *Attorney, Agent, or Firm* — Peter Zura; LOZA & LOZA, LLP

(57) ABSTRACT

Technologies and techniques for providing video data in a motor vehicle, having an input interface configured to obtain an initial video data stream in a first file format, and a converter module, configured to convert the initial video data stream from the first file format into a second file format. The device includes a decoder module, which is coupled to the converter module and is configured to decode the converted video data stream and display the converted video data stream on a canvas element for decoding purposes. The video may include an output interface for outputting the decoded video data stream to a display device.

20 Claims, 1 Drawing Sheet

(51) Int. Cl.
  *H04N 21/414* (2011.01)
  *H04N 21/4223* (2011.01)
  *H04N 21/4782* (2011.01)
  *H04N 21/854* (2011.01)

(52) U.S. Cl.
  CPC ..... *H04N 21/4223* (2013.01); *H04N 21/4782* (2013.01); *H04N 21/85406* (2013.01); *B60K 2360/176* (2024.01)

(58) Field of Classification Search
  USPC .......................................................... 725/106
  See application file for complete search history.

(56) References Cited

U.S. PATENT DOCUMENTS

| | | | |
|---|---|---|---|
| 2014/0355879 A1* | 12/2014 | Agosta | G06T 7/143 382/199 |
| 2015/0229711 A1 | 8/2015 | Krueger | |
| 2016/0212482 A1 | 7/2016 | Balko | |
| 2018/0027264 A1* | 1/2018 | Cheung | H04N 21/8173 725/115 |
| 2018/0253415 A1* | 9/2018 | Halai | G06F 16/95 |
| 2019/0068916 A1* | 2/2019 | Arora | H04N 1/00 |
| 2019/0253742 A1 | 8/2019 | Garten et al. | |
| 2020/0370890 A1* | 11/2020 | Hamilton | G08G 1/04 |
| 2021/0182596 A1* | 6/2021 | Adams | G06V 20/588 |

FOREIGN PATENT DOCUMENTS

| | | |
|---|---|---|
| DE | 202013012645 U1 | 2/2018 |
| DE | 102017130628 A1 | 7/2019 |
| DE | 102019106217 A1 | 9/2019 |
| GB | 2358325 A1 | 7/2001 |

OTHER PUBLICATIONS

DE102020208695.8. Examination Report (Jan. 13, 2021).
Gryc et al. "Why HTML5 is the HMI technology of the future." (German language) (Jul. 18, 2012). URL: https://nanopdf.com/download/warum-html5-die-hmi-technologie-derzukunft-ist_pdf retrieved Nov. 7, 2013.
Wikipedia "Canvas Element" (May 11, 2020). URL: https://en.wikipedia.org/w/index.php?title=canvas_element&oldid=956131625. retrieved Oct. 18, 2021.
Wikipedia "HTML5" (Jun. 26, 2020). URL:https://en.wikipedia.org/w/index.php?title=HTML5&oldid=964669017 retrieved Oct. 18, 2021.
Wikipedia "WebSocket" (Jul. 7, 2020). URL:https://en.wikipedia.org/w/index.php?title=websocket&oldid=966425597 retrieved Oct. 18, 2021.

* cited by examiner

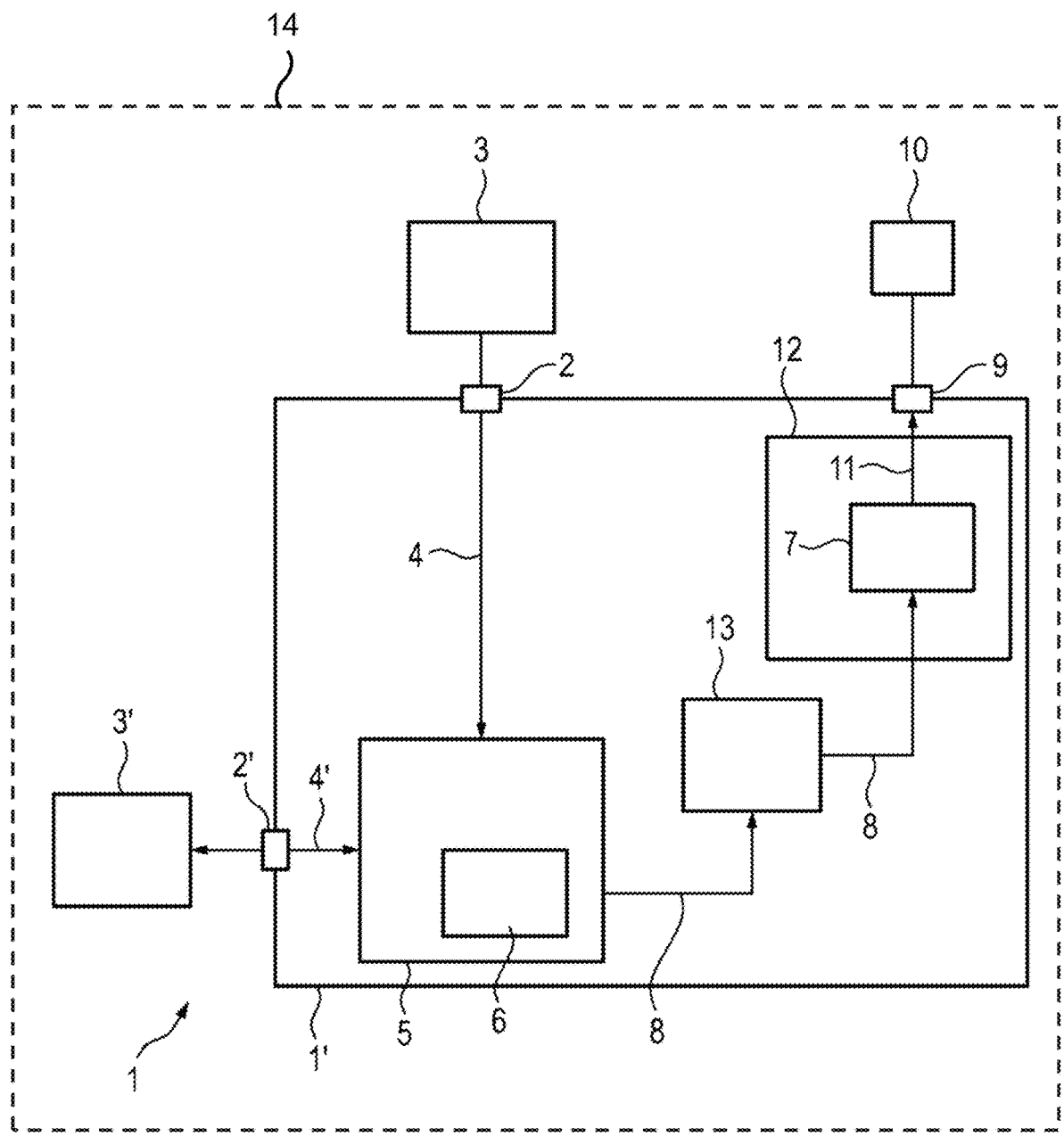

PROVIDING AND DISPLAYING VIDEO DATA

RELATED APPLICATIONS

The present application claims priority to International Patent App. No. PCT/EP2021/069241 to Karpakova, et al., titled "Providing and Displaying Video Data", filed Jul. 9, 2021, which claims priority to German Patent App. No. 10 2020 208 695.8, filed on Jul. 12, 2020, the contents of each being incorporated by reference in their entirety herein.

TECHNICAL FIELD

The present disclosure relates to the processing of video data streams, also referred to as video streams, in motor vehicles. These include, for example, video telephony or the video monitoring of babies and toddlers. Such functions can, in particular, increase the level of comfort for users of the motor vehicle.

BACKGROUND

It is described in document DE 20 2013 012 645 U1 how, within a vehicle platoon, pieces of driving route information are transmitted in real time from a leading vehicle to a following vehicle. The pieces of driving route information can be transmitted in the form of a video stream, for example.

The display of video data streams, however, places certain requirements on the hardware and software architecture of the system for providing or displaying the video data stream. For example, a video codec is generally required for this purpose. As a result, existing processor architectures, such as are used in particular in motor vehicles, do not necessarily provide an option for displaying video data streams.

SUMMARY

Aspects of the present disclosure are directed to providing improved configurations for providing video data, which can be implemented more flexibly by various hardware and/or software architectures.

Some aspects are disclosed in the respective subject matter of the independent claims. Advantageous refinements of the subject matter are further disclosed in the dependent claims.

The improved concepts are based on the idea of converting an initial video data stream into a suitable data format, and to subsequently decode it using a canvas element.

In some examples, a device is disclosed for providing video data in a motor vehicle. The device comprises an input interface, which is configured to receive an initial video data stream in a first file format from a video source. The device comprises a converter module, which is coupled to the input interface and designed to convert the initial video data stream from the first file format into a second file format so as to generate a converted video data stream. The device comprises a decoder module, which is coupled to the converter module and designed to decode the converted video data stream, and to represent the converted video data stream based on a canvas element for decoding purposes. The device comprises an output interface for outputting the decoded video data stream to a display device.

In some examples, a computer-implemented method is disclosed for displaying video data in a vehicle. A video data stream is received in a first file format from a video data source by means of an input interface. The initial video data stream is converted via a converter module, from the first file format into a second file format. The converted video data stream is decoded via a decoder module, wherein the converted video data stream is represented based on a canvas element for decoding purposes. The decoded video data stream is displayed by means of a display device.

Further examples and embodiments of the device according to the improved concept follow directly from the various embodiments of the method according to the improved concept, and vice versa. In particular, a device according to the improved concept can be designed or programmed to carry out a method according to the improved concept, or carries out such a method.

In some examples, a computer program product including commands is also disclosed. When the commands are or the computer program is executed by a device according to the improved concept, the commands prompt the device to carry out a method according to the improved concept.

A computer-readable memory medium is also provided herein, which stores a computer program according to the improved concept.

The computer program and the computer-readable memory medium can each be interpreted as computer program products including the commands.

Aspects of the present disclosure also encompass the combinations of the features of the described embodiments.

Exemplary embodiments of the invention are described hereafter.

BRIEF DESCRIPTION OF THE DRAWINGS

In the following, an embodiment of the present disclosure is described. Therein:

FIG. 1 shows a schematic block diagram of an exemplary embodiment of a device according to some aspects of the present disclosure.

DETAILED DESCRIPTION

The exemplary embodiments described herein are preferred exemplary embodiments of the present disclosure. In the exemplary embodiments, the described components in each case represent individual features of the invention which are to be considered independently of one another and which also refine the invention independently of one another and, as a result, shall also be considered to be an integral part of the invention, either individually or in a combination other than the one shown. Furthermore, the described exemplary embodiments can also be supplemented with additional of the above-described features of the invention.

As used herein, an interface may be understood to include hardware components, that is, for example, connecting elements, plugs and possibly electronic circuits, and/or software components.

As used herein, a module may be interpreted as a hardware module and/or as a software module. In particular, a module can include one or more hardware components as well as one or more software components, which are implemented on the one or more hardware components. A software module or a software component of a module may be understood to mean a functional unit of the program code. A software module can thus include or implement various processing steps and/or data structures.

In some examples, a video data source can generate the initial video data stream in real time and provide it via the input interface of the device, or the initial video data stream can be stored on a memory unit of the video data source. The video data source can include a camera or a server processing unit.

As used herein, a video data stream may be understood to mean a sequence of consecutive image data sets, which can also be referred to as individual images or frames. The video data stream can also include associated audio data.

As used herein, the coupling of two units, for example modules, to one another may be understood to mean, for example, that the corresponding units are able to exchange data unidirectionally or bidirectionally. The coupling can include a physical or wired connection or be designed to be wireless. The canvas element, which can also be referred to as a canvas tag, may in particular be understood to mean an area, definable by means of a mark-up language, for representing or rendering graphical elements or images. The mark-up language can, for example, correspond to a hypertext mark-up language (HTML). The canvas element can, in particular, correspond to a canvas element according to the HTML5 standard.

In some examples, the display device is not necessarily part of the device. In various embodiments of the device, however, the device can also include the display device. The display device can be interpreted as a video display device. In particular, the display device includes a screen or a display for displaying the decoded video data stream.

Since initial video data streams are generally provided by video sources in video formats that necessitate a video codec for decoding and rendering, these cannot be readily played back by systems without such codecs. According to some aspects, this problem is overcome in that the initial video data stream is first converted, so as to then be able to be decoded directly by being represented on the canvas element. In this way, the use of a video tag may be dispensed with. As a result, it is possible to employ universally usable script languages, such as in particular JavaScript, for decoding the converted video data stream. In this way, increased flexibility with regard to the system requirements for playing back or providing the video data stream can advantageously be achieved.

According to at least one embodiment of the device according to some aspects, the input interface includes a bus interface, and in particular a Universal Serial Bus (USB) interface. The input interface can include an Internet Protocol (IP) interface, a Real-Time Transport Protocol (RTP) interface or another network interface in order to receive the initial data stream.

Such interfaces can be used to couple a wide variety of video sources, in particular cameras, for example USB cameras or IP cameras, to the device.

According to at least one embodiment, the device comprises a browser module, in particular a web browser module, which comprises the decoder module. The browser module can also have a connection to the server processing unit or a cloud computer so that the initial and/or the converted video data stream can be transmitted to the server processing unit or the cloud computer.

In particular, the browser module can be configured as a so-called headless browser, that is, as a browser without a graphical user interface (GUI).

According to at least one embodiment, the device comprises the display device, and the display device is coupled to the output interface.

According to at least one embodiment, the device comprises a WebSocket server module, which is designed to receive the converted video data stream from the converter module and to make it available to the decoder module according to a WebSocket protocol.

In this way, for example, the converted video data stream can be conducted from the converter module to a local relay server, which starts a WebSocket connection and makes the converted video data stream available to the decoder module per WebSocket protocol.

According to some aspects, a motor vehicle comprising a device according to the improved concept is also provided herein.

According to at least one embodiment, the motor vehicle comprises the video data source and/or a communication interface for wirelessly communicating with the video source.

According to at least one embodiment, the motor vehicle comprises the display device.

According to at least one embodiment of the method according to some aspects, a script language, in particular JavaScript, is used for decoding the converted video data stream, and in particular for representing the converted video data stream on a canvas element.

This enables high flexibility in the configuration of the underlying hardware and software for displaying or representing the converted video data stream.

According to at least one embodiment, the initial video data stream is received as an MPEG-4 data stream.

In other words, the first file format corresponds to the MPEG-4 video format. The initial video data stream can thus be received, in particular, from server computer systems, serving as the video source, which typically provide video data streams as MPEG-4 data streams, and be displayed corresponding to some aspects.

According to at least one embodiment, the initial video data stream is received as a Real-Time Transport Protocol (RTP) data stream.

In other words, the first file format corresponds to an RTP video format or an RTP-compatible video format. In this way, it is possible, in particular, to employ IP cameras as video sources, which typically provide an initial video data stream according to RTP.

According to at least one embodiment, the converted video data stream is generated as a MPEG-1 data stream as a result of the conversion.

In other words, the second file format corresponds to the MPEG-1 video format. In this way, higher flexibility can be achieved during the decoding of the converted video data stream. In particular, script languages, such as JavaScript, can decode the converted video data stream in the MPEG-1 file format, using the canvas element. According to at least one embodiment, the converted video data stream is made available to the decoder module, according to a WebSocket protocol, for decoding the converted video data stream.

According to at least one embodiment, the steps of receiving and converting the initial video data stream and of decoding the converted video data stream are carried out by means of a processing unit of a motor vehicle.

According to at least one embodiment, the initial video data stream is generated and provided by means of a camera, in particular an IP camera or a USB camera, of the motor vehicle.

According to at least one embodiment, the initial video data stream is wirelessly transmitted by means of a server processing unit to a communication interface of the motor vehicle and is, in particular, supplied from the communication interface to the converter module.

FIG. 1 shows an exemplary embodiment of a device 1 for providing video data in a motor vehicle (14). The motor vehicle can include the device 1. The device 1 can, in particular, include a processing unit 1' of the motor vehicle. The processing unit 1' comprises an input interface 2 for connecting the processing unit 1' to a camera 3, which can be configured as an IP camera or as a USB camera, for example.

The processing unit 1' furthermore comprises a converter module 6, which is coupled to the input interface 2 so as to receive an initial video data stream 4 provided by the camera 3 via the input interface 2. The converter module 6 can, for example, be part of a web application 5.

The processing unit 1' moreover comprises a decoder module 7, which is coupled to the converter module 6 and, for example, can be part of a further web application 12. The further web application 12 can, for example, be configured as a web browser, and in particular as a headless browser. The processing unit 1' moreover comprises an output interface 9 to which a display device 10 of the motor vehicle can be connected.

The processing unit 1' optionally comprises a WebSocket relay server 13, which is arranged between the converter module 6 and the decoder module 7.

The camera 3, as described, provides the initial video data stream 4 via the input interface 2. The video data stream can be present, for example, as an RTP video data stream, in particular when the camera 3 is configured as an IP camera. The video data stream 4, however, can also be present in another video format, for example when the camera 3 is configured as a USB camera.

The converter module 6, which includes a video converter, for example FFmpeg, receives the initial video data stream 4 and converts it into a different video format, in particular MPEG-1, to generate a converted video data stream 8. The converted video data stream 8 is then provided to the decoder module 7.

For this purpose, for example, the web application 5 or the converter module 6 can forward the converted video data stream 8 to the WebSocket relay server 13, which establishes a WebSocket connection to the decoder module 7 or the further web application 12, and makes the converted video data stream 8 available to the further web application 12, and thus to the decoder module 7, according to the WebSocket protocol.

The decoder module 7 then, for example, decodes the converted video data stream 8 by means of a JavaScript video decoder into a decoded video data stream 11, wherein a canvas element is utilized. In particular, the decoder module 7 does not use a video tag for this purpose.

The further web application 12 or the decoder module 7 makes the decoded video data stream 11 available via the output interface 9 to the display device 10, which can then display the decoded video data stream 11 for a user of the motor vehicle.

Optionally, the processing unit 1' can also comprise a further input interface 2' for coupling to a server processing unit 3'. The server processing unit 3' can, for example, make a further initial video data stream 4' available via the further input interface 2' to the web application 5 or to the converter module 6. The processing of the further initial video data stream 4' can then take place as described with respect to the initial video data stream 4. The further initial video data stream 4' can be present in the MEPG-4 video format, for example.

In various embodiments, the web application 5 can also make the initial video data stream 4 available via the further input interface 2' to the server processing unit 3'.

The improved concept, as described, provides a more flexible option for implementing functions in motor vehicles that utilize video data streams.

LIST OF REFERENCE NUMERALS 1 device
1' processing unit
2,2' input interfaces
3, 3' video data sources
4, 4' initial video data streams
5 web application
6 converter module
7 decoder module
8 converted video data stream
9 output interface
10 display device
11 decoded video data stream
12 web application
13 WebSocket relay server

The invention claimed is:

1. A device for providing video data in a motor vehicle, comprising:
an input interface configured to receive an initial sequence of consecutive individual images in a first file format from a camera associated with the motor vehicle;
a converter module, operatively coupled to the input interface and configured as part of the device, the converter module configured to convert the initial sequence of consecutive individual images from the first file format into a second file format compatible with script-based decoding;
a decoder module, operatively coupled to the converter module and configured as part of the device, the decoder module configured to decode the converted sequence of consecutive individual images, using a script language without requiring a video codec, and to represent the converted sequence of consecutive individual images based on a canvas element for decoding purposes; and
an output interface for outputting the decoded sequence of consecutive individual images to a display device configured for use in the motor vehicle.

2. The device according to claim 1, wherein the decoder module comprises a browser module.

3. The device according to claim 1, wherein the decoder module is configured to receive the converted sequence of consecutive individual images from the converter module and to represent the converted sequence of consecutive individual images based on a WebSocket protocol.

4. The device according to claim 1, wherein the decoder module is configured to decode the converted sequence of consecutive individual images utilizing a Javascript language.

5. The device according to claim 1, wherein the initial sequence of consecutive individual images comprises one of (i) an MPEG-4 data stream, or (ii) a Real-Time Transport Protocol data stream.

6. The device according to claim 5, wherein the converted sequence of consecutive individual images comprises an MPEG-1 data stream.

7. The device according to claim 1, wherein the converter module comprises a FFmpeg converter.

8. A method for providing video data in a motor vehicle, comprising:

receiving, via an input interface, an initial sequence of consecutive individual images in a first file format from a camera associated with the motor vehicle;

converting, via a converter module of a device in the motor vehicle, the initial sequence of consecutive individual images from the first file format into a second file format compatible with script-based decoding;

decoding, via a decoder module of the device in the motor vehicle, the converted sequence of consecutive individual images using a script language without requiring a video codec, and representing the converted sequence of consecutive individual images based on a canvas element for decoding purposes; and outputting, via an output interface, the decoded sequence of consecutive individual images to a display device configured for use in the motor vehicle.

9. The method according to claim 8, wherein decoding the converted sequence of consecutive individual images comprises decoding the converted sequence via a browser module.

10. The method according to claim 8, wherein decoding the converted sequence of consecutive individual images and representing the converted sequence is based on a WebSocket protocol.

11. The method according to claim 8, wherein decoding the converted sequence of consecutive individual images comprises utilizing a JavaScript language.

12. The method according to claim 8, wherein the initial sequence of consecutive individual images comprises one of (i) an MPEG-4 data stream, or (ii) a Real-Time Transport Protocol data stream.

13. The method according to claim 8, wherein the converted sequence of consecutive individual images comprises an MPEG-1 data stream.

14. The method according to claim 8, wherein converting the initial sequence of consecutive individual images from the first file format into a second file format comprises converting the initial sequence of consecutive individual images utilizing an FFmpeg platform.

15. A non-transitory computer-readable medium having stored therein instructions executable by one or more processors of a motor vehicle to:

receive, via an input interface, an initial sequence of consecutive individual images in a first file format from a camera associated with the motor vehicle;

convert, via a converter module of a device in the motor vehicle, the initial sequence of consecutive individual images from the first file format into a second file format compatible with script-based decoding;

decode, via a decoder module of the device in the motor vehicle, the converted sequence of consecutive individual images using a script language without requiring a video codec, and representing the converted sequence of consecutive individual images based on a canvas element for decoding purposes; and output, via an output interface, the decoded sequence of consecutive individual images to a display device configured for use in the motor vehicle.

16. The computer-readable medium according to claim 15, wherein the computer-readable medium is configured to decode the converted sequence of consecutive individual images by decoding the converted sequence via a browser module.

17. The computer-readable medium according to claim 15, wherein the computer-readable medium is configured to decode the converted sequence of consecutive individual images and represent the converted sequence utilizing a WebSocket protocol.

18. The computer-readable medium according to claim 15, wherein the computer-readable medium is configured to decode the converted sequence of consecutive individual images utilizing a JavaScript language.

19. The computer-readable medium according to claim 15, wherein the initial sequence of consecutive individual images comprises one of (i) an MPEG-4 data stream, or (ii) a Real-Time Transport Protocol data stream.

20. The computer-readable medium according to claim 19, wherein the converted sequence of consecutive individual images comprises an MPEG-1 data stream.

* * * * *